Figure 1:
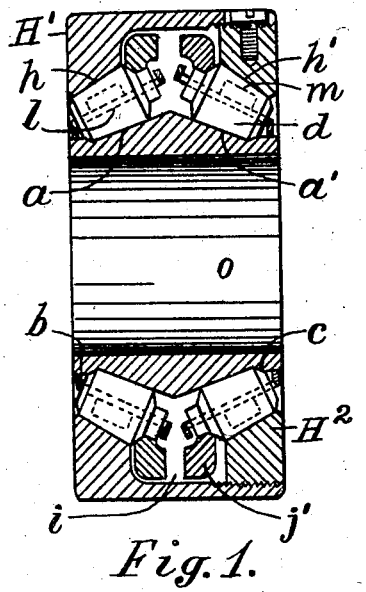

C. S. LOCKWOOD.
ROLLER BEARING WITH ANGULAR ROLLS.
APPLICATION FILED SEPT. 22, 1909.

956,587.

Patented May 3, 1910.

2 SHEETS—SHEET 1.

Witnesses:
L. Lee.
J. W. Greenbaum.

Inventor.
Charles S. Lockwood,
per Thomas S. Crane, Atty.

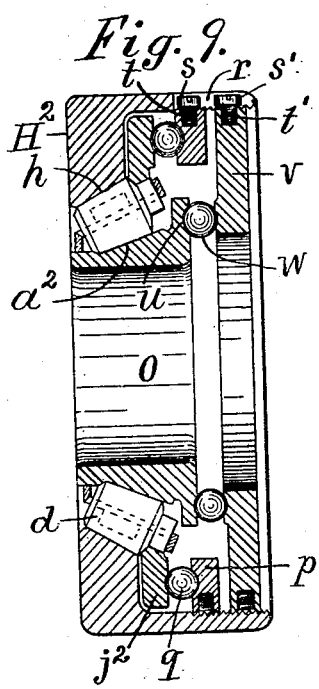
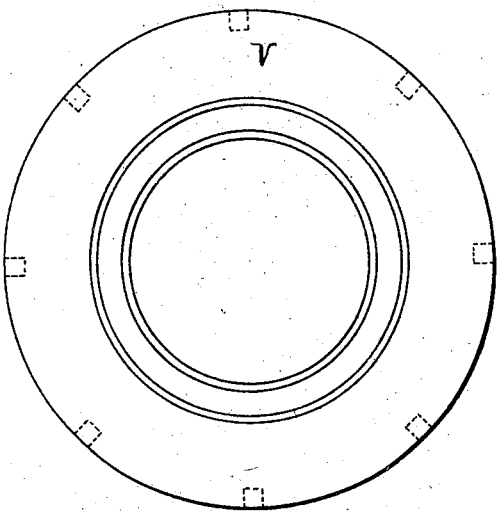
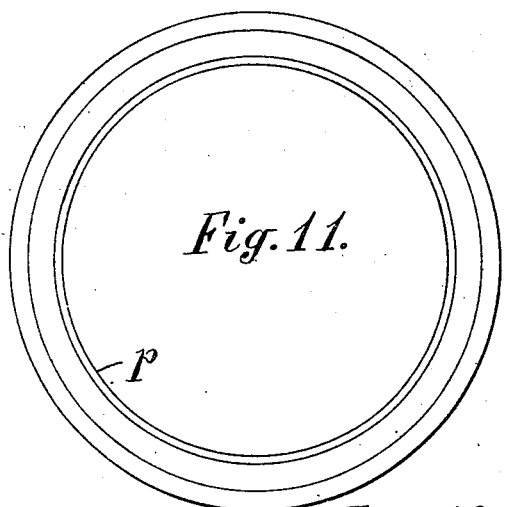
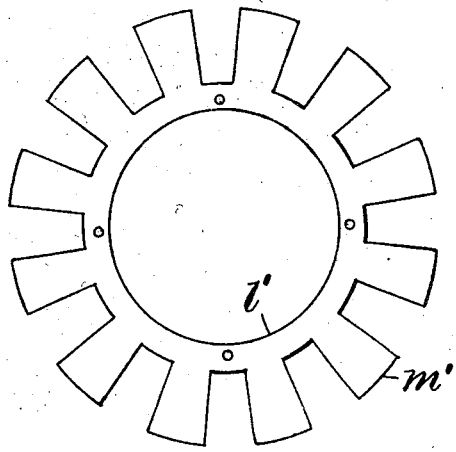
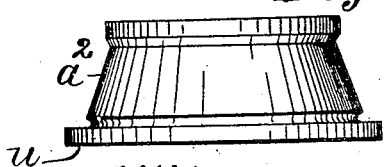
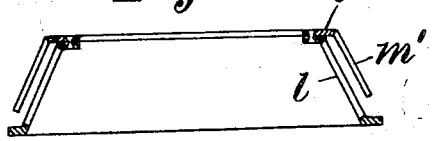

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH ANGULAR ROLLS.

956,587. Specification of Letters Patent. Patented May 3, 1910.

Application filed September 22, 1909. Serial No. 518,927.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings with Angular Rolls, fully described and represented in the following specification and the accompanying drawings, forming a part of the same.

This invention relates to a roller bearing in which a conical hub is used to support a series of conical antifriction rolls which are embraced externally by a tapering casing and, when subjected to end thrust, transmit the same to the conical surface of the hub through the bodies of the rolls. Such end thrust when applied to the casing tends to slide the rolls endwise upon the conical surface of the hub, and such end movement can be resisted and the end thrust fully supported, by restraining the rolls from any expansive movement.

The object of the present invention is to furnish a means of very cheap and simple character for resisting any expansion of the rolls and thus preventing end movement.

The means employed consists of a central stud upon the larger end of each of the rolls and a clamp-ring having an interior ridge fitted to the exterior of such studs, and rotated freely with the rolls in their movement around the hub. The stud is preferably joined to the end of the roll with a flaring shoulder, which, with the cylindrical surface of the stud, forms a groove or neck at the end of the roll to which a ridge upon the encircling clamp-ring is fitted.

To engage the neck upon each roll with the ridge upon the clamp-ring requires the roll to be placed into its working position independently, before the casing is applied, and when the latter is fitted upon the exterior of the rolls they are held in contact with the clamp-ring and the clamp-ring prevents any expansive or end movement of the rolls.

The conical hub is preferably furnished at its smaller end with a flaring collar at the point where the lower ends of the rolls revolve, and the lower ends of the rolls are, in such case, formed with beveled ends to roll upon the said collar, the latter thus preventing endwise movement of the rolls in one direction, while the clamp-ring prevents end movement in the opposite direction, and the rolls are thus held continuously in a circular path about the hub without any material rubbing friction.

The invention will be understood by reference to the annexed drawing, in which—

Figure 2:
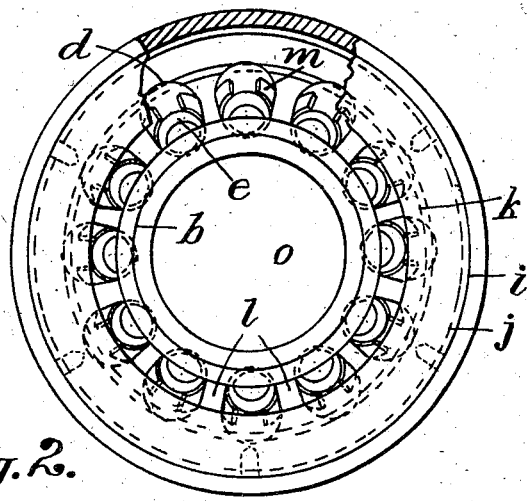
Figure 3:
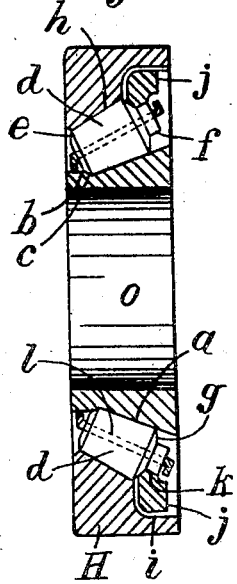
Figure 4:
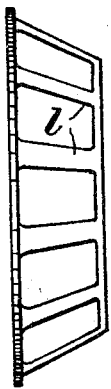
Figure 5:
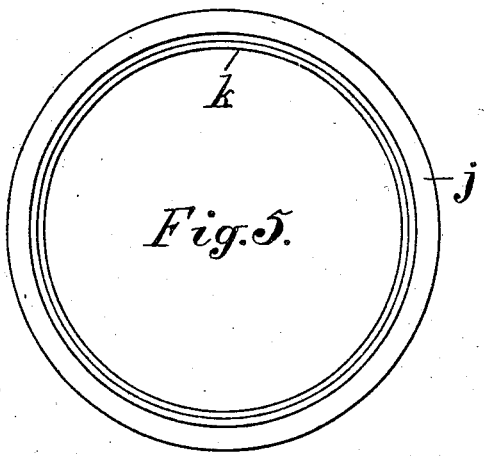
Figure 6:
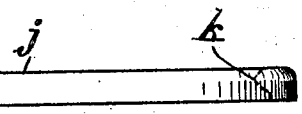
Figure 7:
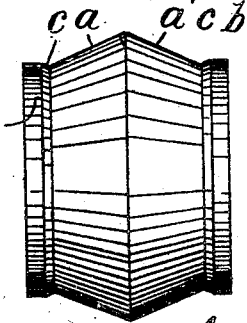
Figure 8:

Figure 1 is a central cross-section of a double thrust-bearing provided with the improvement; Fig. 2 is an end view of the same with a portion of the casing broken away to expose the rolls and the cage which guides them in their movement; Fig. 3 is a section, similar to Fig. 1, of a single thrust-bearing; Fig. 4 is an edge view of the cage used in said bearing; Fig. 5 is an end view and Fig. 6 an edge view of the clamp-ring. Fig. 7 is an elevation of the hub, and Fig. 8 an elevation of one of the rolls. Fig. 9 is a cross-section of a single thrust-bearing with means for adjusting the hub and the clamp-ring longitudinally within the casing; Fig. 10 is an elevation of the adjusting-ring for the hub; Fig. 11 is an elevation of the adjusting-ring for the clamp-ring, and Fig. 12 is an elevation of the hub. Fig. 13 is a cross section of the cage shown in Fig. 9, and Fig. 14 shows a blank for the retainer used upon such cage.

Taking the simplest construction, which is shown in Fig. 3, the hub is shown with a single conical seat $a$ and an extension at the smaller end having a cylindrical seat $b$ and a flaring collar $c$. The rolls are formed with a conical body $d$, a beveled smaller end $e$ fitted to the flaring collar $c$, and at the larger end with a cylindrical stud $f$ connected to the body of the roll by a flaring shoulder $g$, which forms a so-called neck upon each roll. The casing H which surrounds the rolls is provided with a tapering seat $h$ fitted to embrace the bodies of the rolls, an annular recess $i$ at the larger end of such seat extended to the end of the casing, and the clamp-ring $j$ is fitted to revolve in such recess and has an interior annular ridge $k$ which is beveled to fit the stud $f$ and the flaring collar $g$, which form the neck of each roll. The angular position of each roll upon the conical hub tips the cylindrical surface of the stud $f$ to an angle with the axis of the bearing, and the studs thus serve to retain the clamp-ring $j$ in place upon the necks of the rolls. When the bearing-roll is in operation, the clamp-ring is carried around by the rolls having contact only with the necks and having only a rolling friction which offers no appreciable resistance to the movement of the rolls. As the neck upon each roll serves to hold the ring in place, so in like manner the ring holds the rolls upon the conical hub, so that they cannot be withdrawn from their working position without directing the smaller end of the roll outwardly from the hub to clear the flaring collar $c$, as indicated by the dotted roll $d$ in Fig. 6. This is readily effected when the casing is removed. A cage having bars $l$ fitted to the opposite sides of the rolls at their diametral line, is shown in Fig. 4 and indicated by dotted lines in the other figures. Such cage may be formed with lugs $m$ curved upwardly from the bars over the rolls, as shown in Fig. 2, to retain them in place, or as the skeleton cage shown in Fig. 4, which permits the smaller ends of the rolls to be drawn outwardly from the hub when placing them in their working position, or removing them therefrom.

A modified form of the cage is shown in Figs. 13 and 14, where a supplemental ring $l'$ is secured upon the outer side of a skeleton cage and formed with fingers $m'$ which extend between the rolls outside their diametral line, and thus prevent them from falling out of the cage when the casing is removed, as the space between these fingers is smaller than the diameter of the rolls. This keeper is formed from the star-shaped blank shown in Fig. 14, the fingers $m'$ being bent at a suitable angle from the plane of the ring $l'$ before the ring is attached to the cage, or after the rolls are set in place.

The bearing shown in Fig. 3 is adapted to resist end thrust or pressure upon the casing in one direction, but not in the opposite direction; and two of the constructions can therefore be combined, as shown in Fig. 1, to resist end thrust in both directions.

In Fig. 1, the hub is shown with two opposed conical seats $a$ and $a'$, and the casing $H'$ with opposed conical seats $h$ and $h'$, the latter being formed upon a detachable ring $H^2$ which is screwed into the outer end of the recess $i$ so as to adjust the seats $h$ and $h'$ upon the surface of the rolls.

In Fig. 9, a ring $p$ is screwed into the thread within the casing and such ring and the clamp-ring $j^2$ are provided upon their opposed faces with annular ball-seats, and balls $q$ are inserted therein. A longitudinal notch $r$ is cut in the open threaded end of the casing, and a screw $s$ inserted through the notch into any one of a series of holes $t$ in the adjusting-ring $p$, to hold it in position when adjusted. The end of the hub $a^2$ is formed with an annular ball-seat $u$, and an adjusting-ring $v$ is screwed into the open end of the casing and provided with a ball-seat opposed to the ball-seat $u$, and balls $w$ are fitted to the opposed seats. The ring $v$ when adjusted sets the hub so as to hold the rolls in the proper relation to the tapering seat $h$, and is held in position when adjusted by a screw $s'$ operating with a series of holes $t'$ in the ring $v$ the same as the screw $s$ upon the ring $p$. The adjusting rings $p$ and $v$ provide means of compensating for wear of the parts, and for their primary adjustment toward one another so as to operate in the most perfect manner without lost motion.

In using such bearings, the casing is secured in any suitable socket upon the frame of a machine, and a shaft or axle is secured in the bore $o$ of the hub, and the construction then resists end thrust and prevents end movement of the shaft or casing in one or both directions.

Having thus set forth the nature of the invention what is claimed herein is:

1. In a roller bearing, the combination, with a hub having a conical seat and a collar at the smaller end of such seat, of a series of conical rolls fitted to the conical seat and having their ends fitted to the said collar, each roll having a neck at the larger end, a cage with pockets fitted to the sides of the several rolls, a casing having tapering seat to embrace the said rolls and an annular recess at the larger end of such seat, and a clamp-ring fitted to turn in such recess and fitted to the necks of the said rolls and operating to confine the rolls in contact with the collar.

2. In a roller bearing, the combination, with a hub having a conical seat, of a series of conical rolls fitted thereto and having each a central stud upon its larger end inclined to the axis of the bearing, a clamp-ring arranged to embrace all of the studs to resist expansion of the rolls upon their seat, a casing having a tapering seat to embrace the said rolls and an annular recess at the larger end of such seat to inclose the clamp-ring, and an adjusting-ring secured adjustably in the casing with a series of balls fitted to seats upon the clamp-ring and upon the adjusting-ring.

3. In a roller bearing, the combination, with a hub having a conical seat and an annular ball-seat at the larger end of such conical seat, of a series of conical rolls fitted to the conical seat, each roll having a neck at the larger end, a casing having a tapering seat to embrace the said rolls and an annular recess at the larger end of such seat, a clamp-ring fitted to turn in such recess and fitted to the necks of the rolls, and an adjusting-ring held adjustably in the said recess and having an annular ball-seat opposed to the ball-seat upon the hub with a series of balls fitted to the opposed seats, as and for the purpose set forth.

4. In a roller bearing, the combination, with a hub having a conical seat and an annular ball-seat at the larger end of the hub, of a series of conical rolls fitted thereto and having each a central stud upon its larger end inclined to the axis of the bearing, a clamp-ring fitted to all of the said studs, a casing having a tapering seat embracing the series of rolls and an annular recess at the larger end of such seat extending beyond the larger end of the hub and threaded internally, the adjusting-ring $p$ screwed within the casing, a series of balls fitted to ball-seats in the clamp-ring and the said adjusting-ring, the adjusting-ring $v$ screwed within the casing and having an annular ball-seat opposed to the ball-seat upon the hub, balls $w$ fitted to the two seats and means for securing the rings $p$ and $v$ within the casing when adjusted.

In testimony whereof I have hereunto set my hand in the presence of two subscribing witnesses.

CHARLES S. LOCKWOOD.

Witnesses:
L. LEE,
THOMAS S. CRANE.